United States Patent [19]
Tulpule et al.

[11] Patent Number: 5,617,544
[45] Date of Patent: Apr. 1, 1997

[54] INTERFACE HAVING RECEIVE AND TRANSMIT MESSAGE LABEL MEMORIES FOR PROVIDING COMMUNICATION BETWEEN A HOST COMPUTER AND A BUS

[75] Inventors: Bhalchandra R. Tulpule, Farmington; Steven A. Avritch, Bristol; Geoffrey T. Blackwell, Vernon; Andrew M. MacKay, Newington, all of Conn.

[73] Assignee: United Technologies Corporation, Hartford, Conn.

[21] Appl. No.: 363,604

[22] Filed: Dec. 23, 1994

[51] Int. Cl.$^6$ ........................................... G06F 13/00
[52] U.S. Cl. ........................................... 395/281; 395/280
[58] Field of Search .................... 395/280, 281, 395/180, 800, 775, 200.01, 200.08; 370/94.1, 85.1, 60; 379/229

[56] References Cited

U.S. PATENT DOCUMENTS

| | | | |
|---|---|---|---|
| 3,911,403 | 10/1975 | O'Neill, Jr. ........................... | 395/494 |
| 3,969,701 | 7/1976 | Hemdal ................................. | 395/800 |
| 4,500,989 | 2/1985 | Dahod ................................... | 370/85.1 |
| 4,623,997 | 11/1986 | Tulpule ................................. | 370/85.1 |
| 4,625,307 | 11/1986 | Tulpule et al. ..................... | 370/85.13 |
| 4,635,254 | 1/1987 | Tulpule et al. ..................... | 370/85.1 |
| 4,689,765 | 8/1987 | Hooper ................................. | 395/775 |
| 5,187,591 | 2/1993 | Guy et al. ........................... | 358/425 |
| 5,210,749 | 5/1993 | Firoozmand ......................... | 370/85.1 |
| 5,333,135 | 7/1994 | Wendorf ............................... | 370/94.1 |
| 5,497,461 | 3/1996 | Matsumoto et al. ............... | 395/185.04 |
| 5,504,749 | 4/1996 | Cheon ................................... | 370/94.1 |

Primary Examiner—Gopal C. Ray
Attorney, Agent, or Firm—Francis J. Maguire

[57] ABSTRACT

An interface between a host and a bus includes label generator and a memory. The label generator responds to bus label signals from the bus, for providing label signals. The memory responds to bus signals from the bus, for providing memory host signals to the bus. The memory further reponds to the label signals from the label generator for storing the label signals as label memory signals. The memory further responds to host signals from the host, either for providing memory bus signals to the host when the host reads memory bus information from the memory, or for providing said label memory signals to the host when the host reads label memory information from the memory.

12 Claims, 7 Drawing Sheets

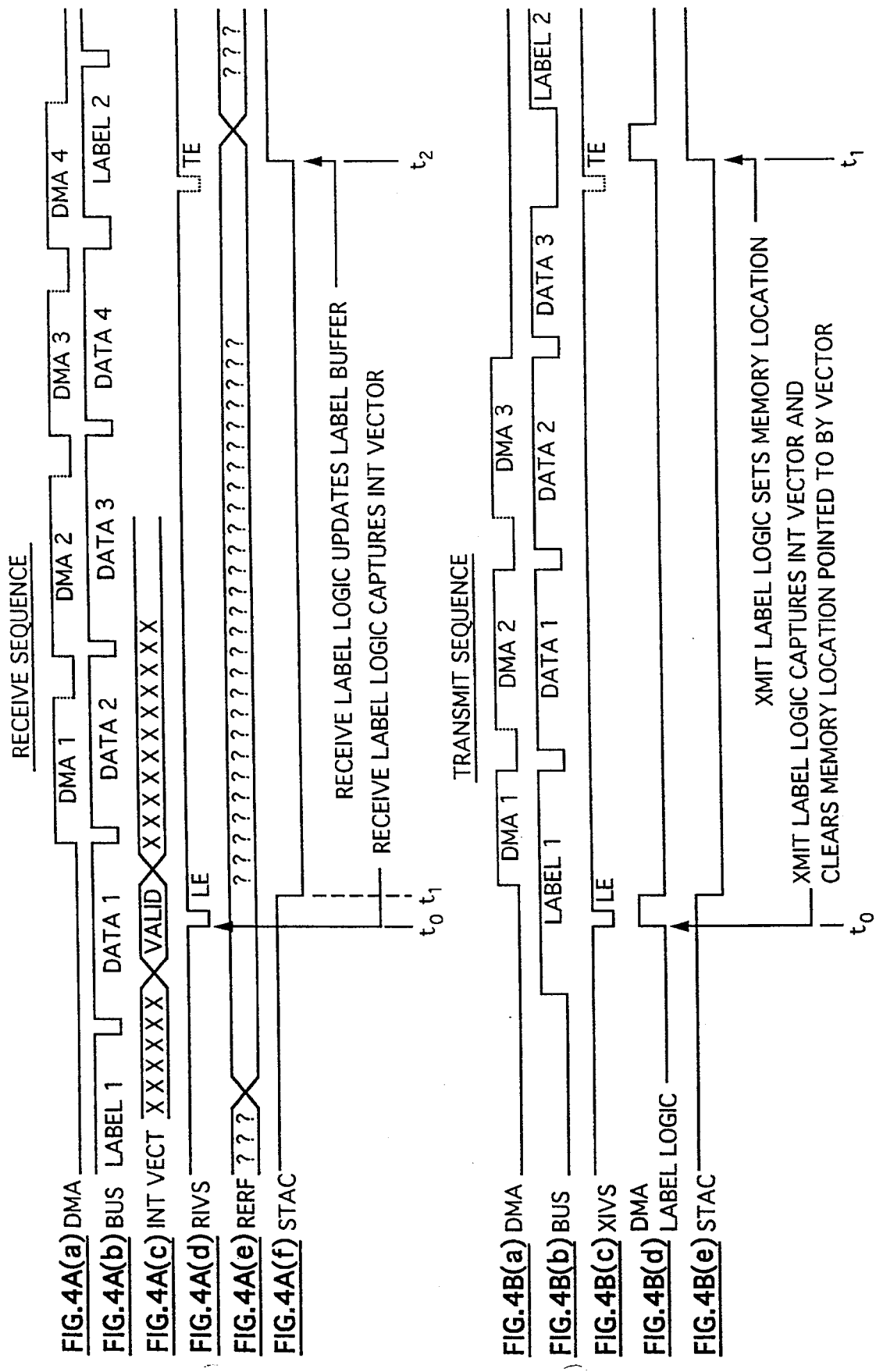

INTERFACE HAVING RECEIVE AND TRANSMIT MESSAGE LABEL MEMORIES FOR PROVIDING COMMUNICATION BETWEEN A HOST COMPUTER AND A BUS

BACKGROUND OF THE INVENTION

1. Field of the Invention

The present invention generally relates to a communication interface which guarantees the coherency of data transferred between a communication bus and a host interfaced thereto.

2. Description of the Prior Art

Historically, an important goal of communication interfaces has been to ensure the integrity of data transfers between a communication bus and a host. This is particularly important, and can be more difficult to achieve, in systems having a large number of high speed bus devices communicating with a host. As a result, various interface buffering schemes have been developed to ensure data integrity.

Such an interface is disclosed in U.S. Pat. No. 4,623,997, issued to Tulpule on Nov. 18, 1986, entitled COHERENT INTERFACE WITH WRAPAROUND RECEIVE AND TRANSMIT MEMORIES. The disclosed interface is designed to ensure the coherency of messages transferred between an asynchronous bus and an attached subsystem. As disclosed in that patent, a coherent message is one in which the data or parameters refer to a unique computation performed in a unique data set and also belonging to a unique time frame. Incoherency occurs when a message contains data belonging to different time frames, computations or data sets. This typically occurs when data from a previous message is overwritten before it can be processed by a host CPU.

According to that patent, data integrity or coherency is achieved through the use of separate, wraparound receive and transmit memories for storing message strings. As messages are received by the interface, they are sequentially stored in the next available address in a wraparound receive buffer. Once the last memory address in the receive buffer has been written to, the next data segment is written into the first buffer location, wrapping around and overwriting any old data stored there. A similar arrangement is disclosed for the transmission of messages from the host CPU to a bus device.

Although the invention disclosed in the above mentioned patent is more likely to maintain data coherency than predecessor designs which featured, for example, a single buffer for both receive and transmit message strings, it does have certain limitations which may adversely affect data integrity and coherency. For example, it relies on sizing the receive memory so that sufficient receive messages can be stored to avoid overwriting messages which have not yet been processed by the host CPU. Sizing of the receive memory can only be done after certain assumptions are made about the number of devices which will be sending messages to the host CPU along with the estimated message length and transmission frequency. Although a safety factor can be built into this calculation, there is no guarantee that data coherency can be maintained. Systemic changes in either the frequency or length of messages sent from the bus devices, or in the host CPU's processing capability could result in unprocessed messages being overwritten.

Consequently, a means for providing an interface between a host and a bus having multiple, high speed devices which can ensure coherency of data transfers is highly desirable.

DISCLOSURE OF THE INVENTION

The present invention is designed to overcome the limitations discussed above and towards that end it includes a novel communication interface between a host and a bus which ensures data coherency through the generation and management of receive and transmit message labels.

An interface according to the present invention between a host means and a bus means comprises a label generation means, responsive to bus label signals from the bus means, for providing label signals and further comprising a memory means, responsive to bus signals from the bus means for either storing said bus signals or providing memory host signals to the bus means, said memory means being further responsive to said label signals from said label generation means for storing said label signals, said memory means being further responsive to host signals from the host means for providing either memory bus signals or said stored label signals to the host means.

The interface according to one aspect of the present invention includes dedicated Random Access Memory (RAM) for storing message strings which is directly accessible by both the host and the bus. Thus, message strings received from devices on the bus are written directly into dedicated interface RAM locations by the bus. At the same time, the interface is notified by the bus that a message string has been received from a device on the bus. The interface then generates and stores a receive label corresponding to the message string just received. This receive label contains address and data allocation information for that message string. As more message strings are received from the bus and written into their dedicated memory locations, more receive labels are generated and stored in receive label memory. This receive label memory is managed internally by the interface and is accessible to the host on a read only basis when the host is free to process message strings.

To retrieve a stored message string, the host queries the receive label memory to identify the next message string to be processed. With the information from the receive label, the host can directly access the message string stored in interface RAM.

The interface also stores and manages message strings being transmitted from the host to a device on the bus. As with the receive label memory, transmit label information is managed by the interface and made available to the host on a read only basis.

So, according to another aspect of the invention, the host first queries the interface to ensure that a transmit message is not being currently serviced by the bus. If the bus is not processing that message string, then the host writes the next transmit message string into dedicated interface RAM and signals the bus that a new message string is ready to be processed. If the bus is busy transmitting the identical message, the host retries the update after a delay ensuring a coherent transmission.

Therefore, it is an object of the present invention to provide an interface between a host and a bus which ensures dam coherency through the generation and management of transmit and receive message labels, corresponding to message strings stored in dedicated memory, the message strings being directly accessible by both the host and bus.

Other objects and advantages will become apparent to those skilled in the art from the following detailed description read in conjunction with the appended claims and drawings attached hereto.

BRIEF DESCRIPTION OF THE DRAWINGS

FIGS. 4A(a)–4A(f) is a timing diagram of the interface receive sequence according to the present invention, where FIGS. 4A(a)–4A(f) are on a common time line;

FIGS. 4B(a)–4B(e) is a timing diagram of the interface transmit sequence according to the present invention, where 4B(a)–4B(e) are on a common time line;

BEST MODE FOR CARRYING OUT THE INVENTION

Figure 1:
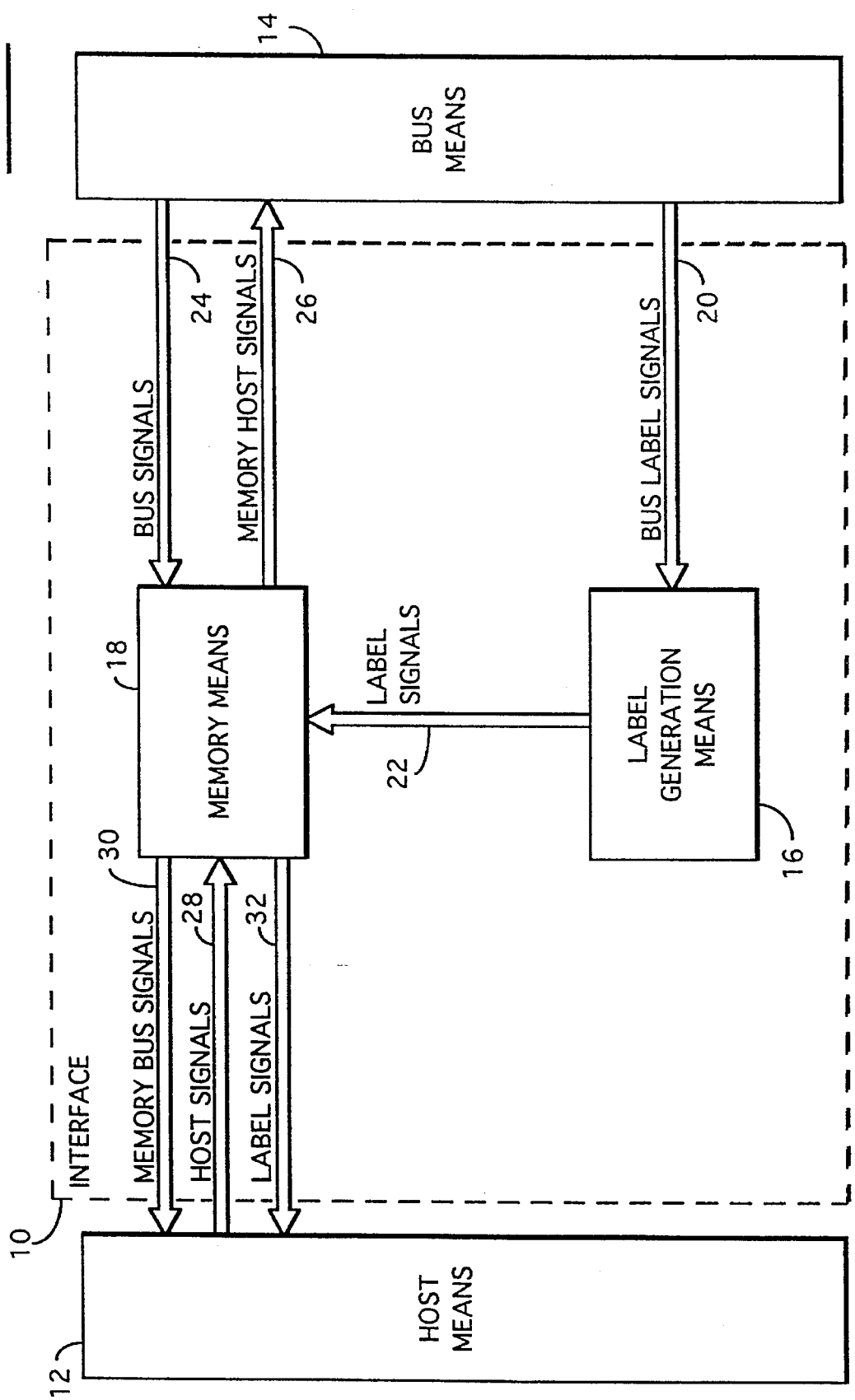
FIG. 1, is a simplified functional block diagram of the interface according to the present invention.

Referring to the drawings wherein like numerals indicate like elements throughout the several figures, an interface embodying the principles of the present invention is generally indicated at 10 in FIG. 1. As previously discussed, the interface according to the present invention generally facilitates the transmission of message strings between a host means 12, which typically includes a signal processor, and any number of devices (not shown) attached to a bus means 14. The interface stores and manages message strings to accommodate differences in processing capabilities between the host means 12 and any number of devices attached to the bus means 14. As shown, the interface generally includes label generation means 16 and memory means 18. Although throughout the various figures the interface is illustrated as being comprised of several separate blocks, it should be understood that these blocks may be implemented together with varying degrees of hardware and software.

For purposes of discussion, message strings can include various numbers of data bytes and are considered to be either "received" or "transmitted" from the perspective of the host means 12 and the interface. That is, message strings transferred from the bus means 14 to the host means 12 are considered to be "received" by the host means 12 from the bus means 14. Likewise, message strings transferred from the host means 12 to the bus means 14 are considered to be "transmitted" by the host means 12 onto the bus means 14. Finally, message strings being received may, from time to time, be referred to as "receive message strings". Similarly, message strings being transmitted may, from time to time be referred to as "transmit message strings." Although this convention has been adopted for purposes of discussion, it should be understood that the nomenclature could be revised or another suitable convention used.

Message strings received by the interface from the bus means 14 are processed through a receive sequence which is discussed in more detail below. Generally, as message strings are received from the bus means 14, they are stored in the memory means 18 until they can be read by the host means 12. A receive label containing information about the location of the message string is generated by the label generation means 16 and stored in the memory means 18. The host means 12 periodically reads the contents of the stored receive labels from the memory means 18 to acknowledge reception of message strings received during a particular service interval. This method of storing message strings and managing the message strings using receive labels allows a host means 12 with limited processing capability to communicate with a large number of devices, some high speed, connected to the bus means 14, while maintaining data coherency.

On the other hand, message strings transmitted by the host means 12 are processed by an interface transmit sequence which is discussed in more detail below. The bus means 14 may be connected to and serving any number of devices, some of which may have higher service priorities. Consequently, the host means 12 may be able to transmit message strings onto the bus means 14 faster than the bus means could process them. To alleviate this problem, the interface provides for the temporary storage and management of message strings being transferred to the bus means 14. With this scheme, the host means 12 can write transmit message strings to interface RAM, signal the bus means 14 that a transmit message is ready and then continue with other processes, without having to wait for the bus means 14 to process the transmit message strings.

Generally, as with the receive sequence, transmit labels are generated by the by the label generation means 16 for each transmit message string and stored in the memory means 18. Each transmit label contains information about the memory location of a particular message string. After being notified by the host means 12 and when the bus means 14 is ready to process a transmit message string, it reads the contents of the next transmit label from the memory means 18 to locate the corresponding message string.

As shown in the simplified functional block diagram of FIG. 1, the label generation means 16 responds to bus label signals on lines 20 from the bus means 14 for generating receive and transmit labels and then provides those receive and transmit labels via label signals on lines 22 to the memory means 18 for storage. The memory means 18 responds to bus signals on lines 24 from the bus means 14 for storing receive message strings and provides transmit message strings via memory host signals on lines 26 back to the bus means 14. The memory means 18 also responds to label signals on lines 22 from the label generation means 16 for storing receive and transmit labels generated by the label generation means 16. Finally, the memory means 18 responds to host signals on lines 28 from the host means 12 and provides either receive message string data via memory bus signals on lines 30 or receive or transmit label data via label signals on lines 32 back to the host means 12.

Figure 2:
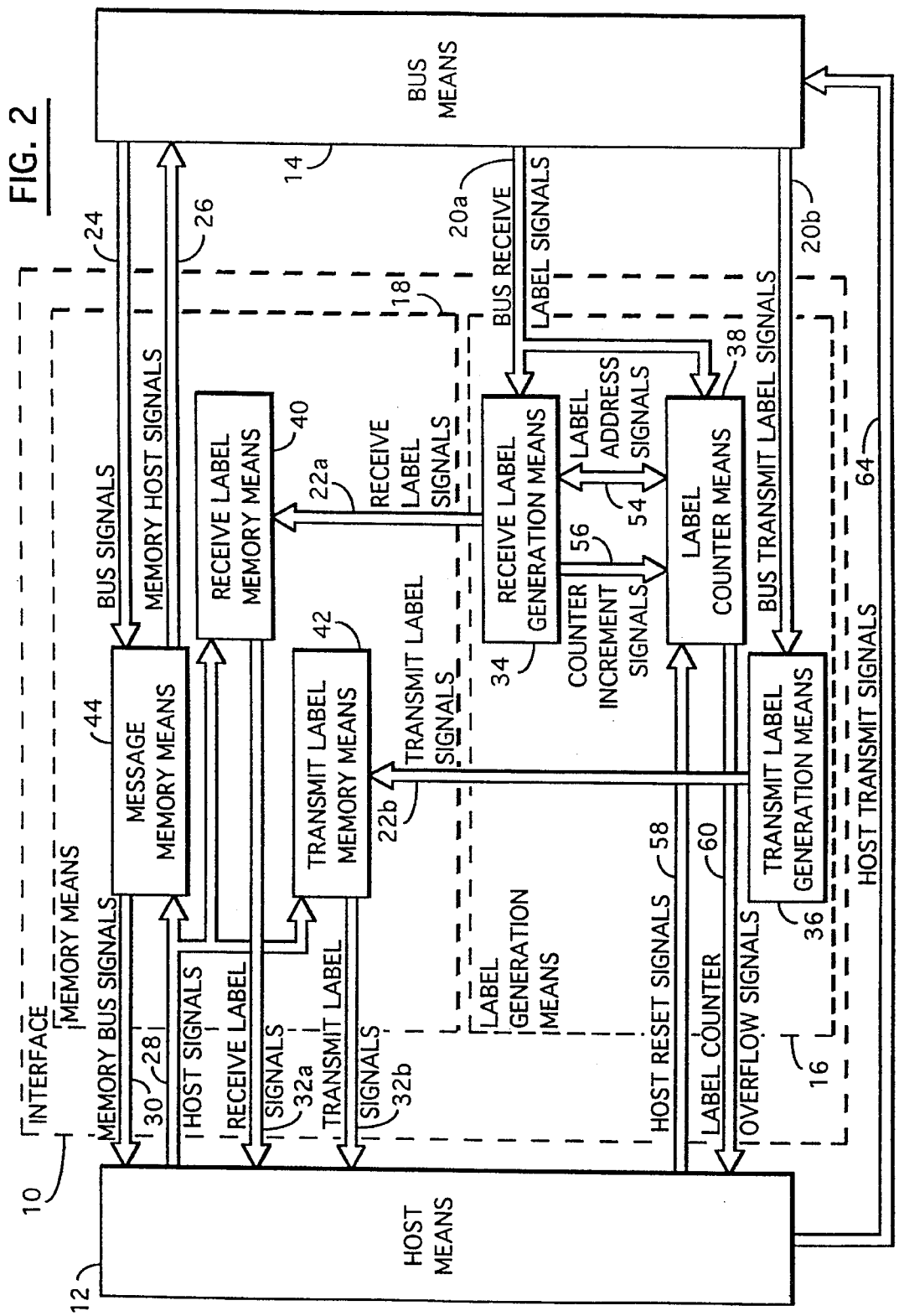
FIG. 2, is a more detailed functional block diagram of the interface according to the present invention.

Turning now to the more detailed functional block diagram of the interface in FIG. 2, the label generation means 16 includes receive label generation means 34, transmit label generation means 36 and label counter means 38. In addition, the memory means 18 includes receive label memory means 40, transmit label memory means 42 and message memory means 44. The memory means 18 could include both hardware and software and it typically will include Random Access Memory (RAM) which is directly accessible by the host means 12, bus means 14 and the label generation means 16. The bus label signals on lines 20 of FIG. 1 between the bus means 14 and the label generation means 16, are shown in more detail in FIG. 2 and include bus receive label signals on lines 20a and bus transmit label signals on lines 20b. The label signals on lines 22 of FIG. 1 are also shown in more detail in FIG. 2 and include receive label signals on lines 22a and transmit label signals on lines 22b.

The receive sequence for processing receive message strings is initiated when the interface detects the arrival of a message string from the bus means 14. The bus means signals the interface via the bus receive label signals on lines 20a that a receive message string has been written to the message memory means 44. In response, the interface generates a receive label for that receive message string and stores it in the receive label memory means 40. This stored label is available to the host means 12 on a read only basis via the receive label signals 32a, when the host means 12 periodically services the receive label memory means 40 to minimize the number of unacknowledged messages. Additional receive message strings are stored in the same manner for future processing by the host means 12.

Figure 3:
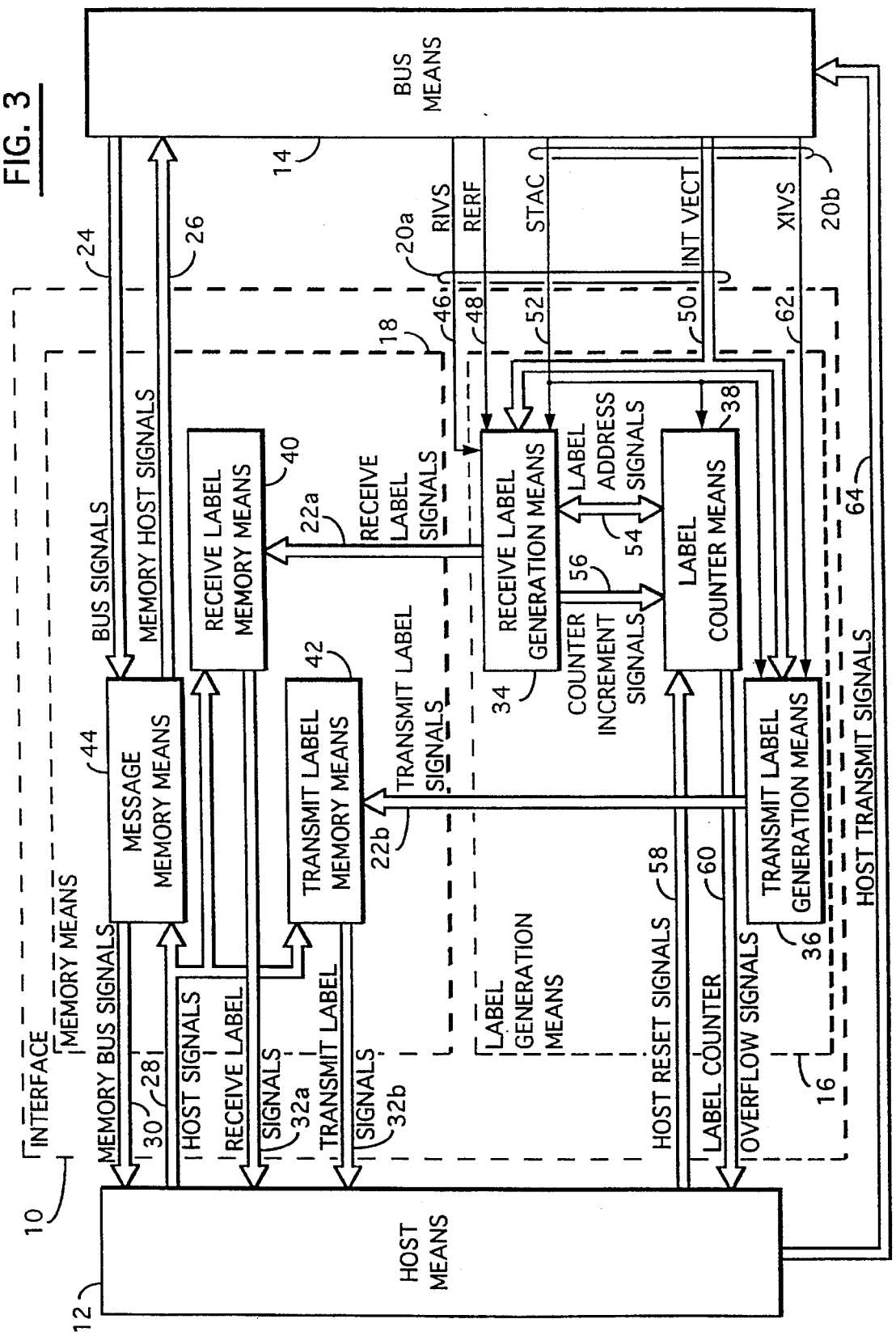
FIG. 3, is a still more detailed functional block diagram of the interface according to the present invention and, in particular, shows the Bus Receive Label Signals and the Bus Transmit Label Signals of FIG. 2 in more detail.
Figure 5A:
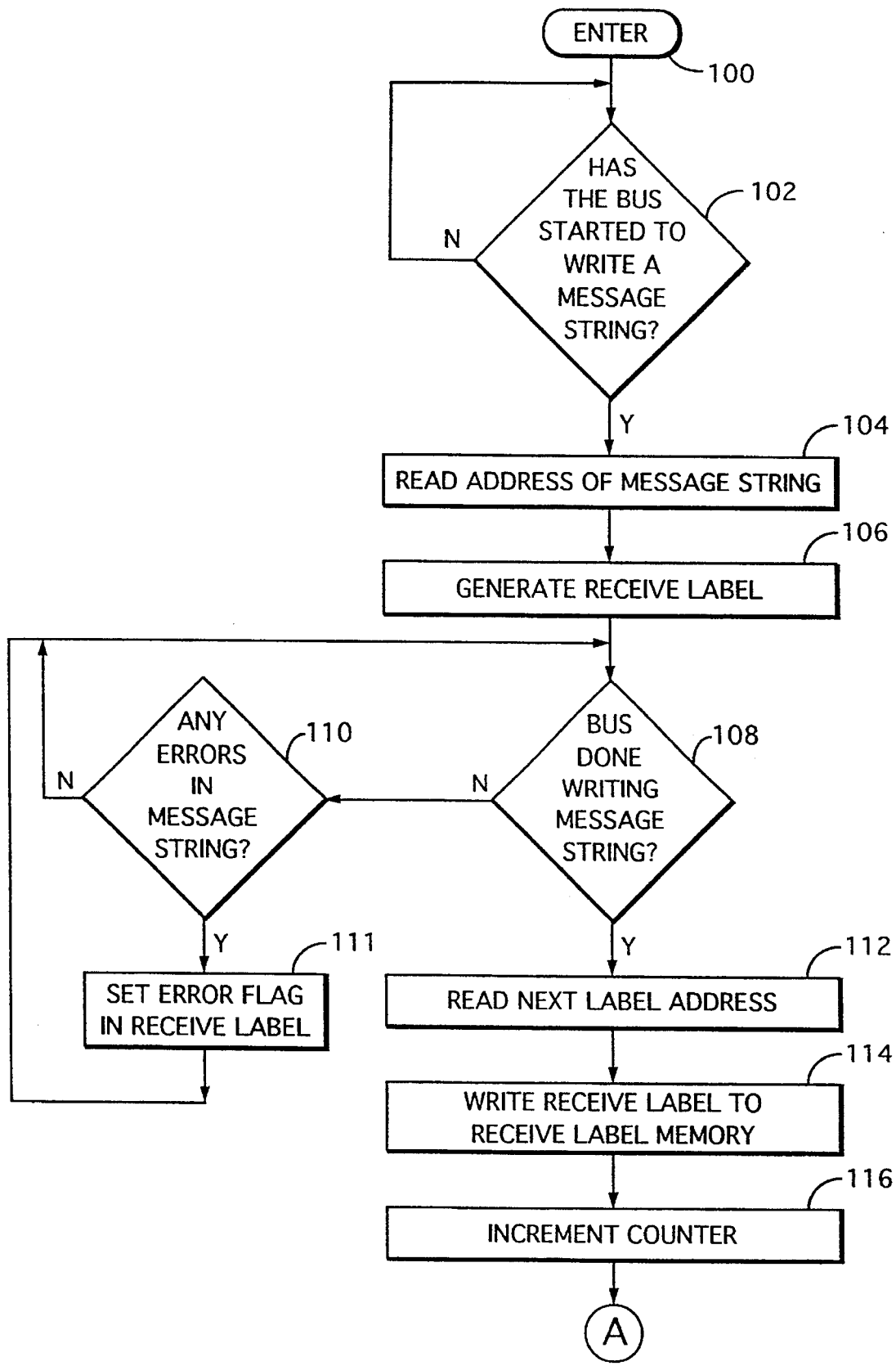
FIGS. 5A and 5B, is a top level flow chart illustration of the interface receive sequence according to the present invention.
Figure 5B:
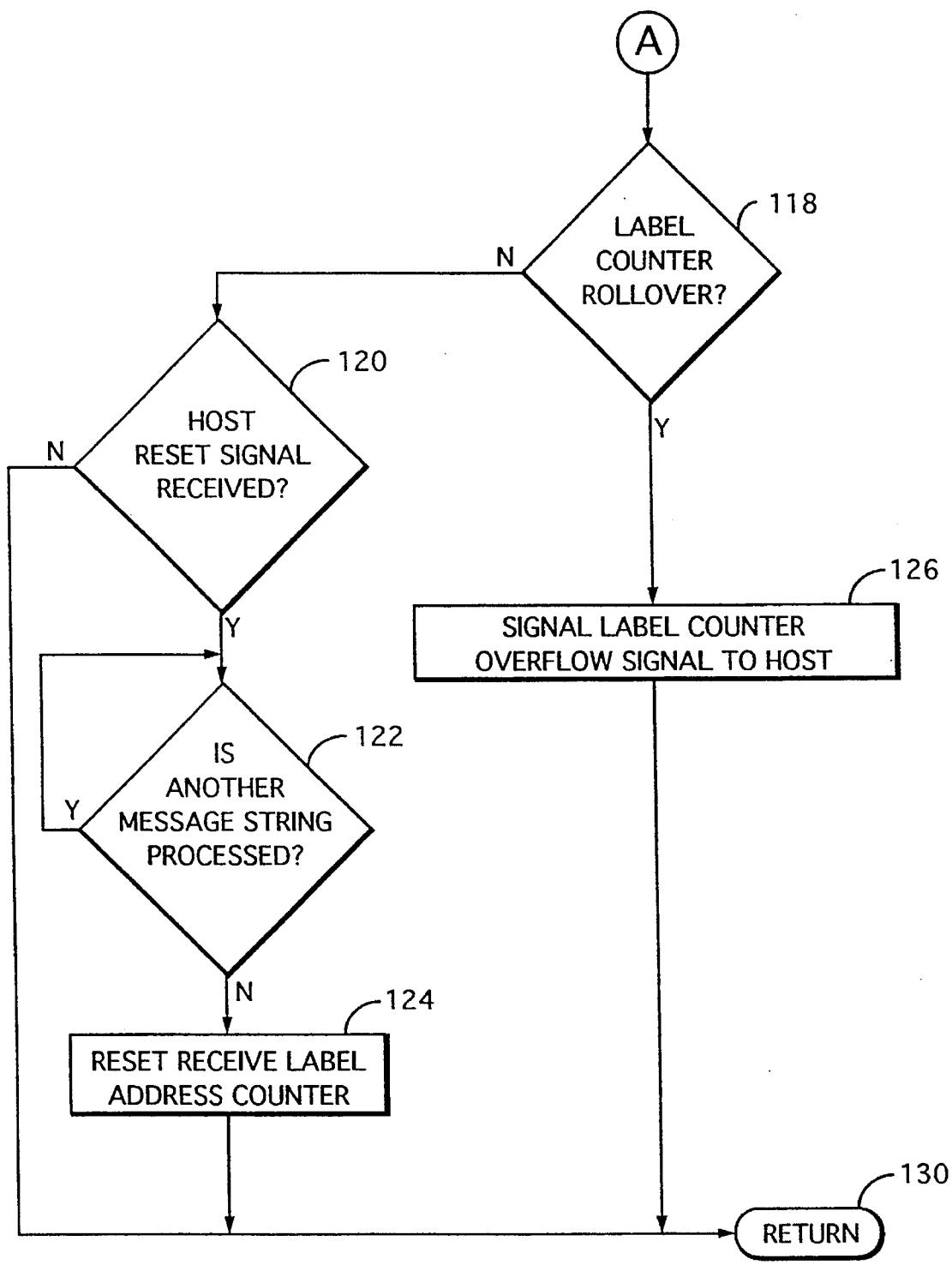

The top level flow chart illustration of FIG. 5 and the timing diagram of FIG. 4A illustrate some particular aspects of the receive sequence. Note that the signals shown in the timing diagrams of FIGS. 4A and 4B are each on common time lines. After entering the receive sequence in step 100, the interface monitors the bus receive label signals on lines 20a in step 102 to detect when the bus means 14 begins to write a message string to the message memory means 44. As shown in FIG. 3, the bus receive label signals on lines 20a include a Receive Interrupt Vector signal (RIVS) on line 46, a Receive Error Free signal (RERF) on line 48, an Interrupt Vector signal (INTVECT) on lines 50 and a String Active signal (STAC) on line 52. So, during step 102, the receive label generation means 34 continually monitors the RIVS signal of FIG. 4A(d). The assertion of RIVS at time $t_0$ signals the start of the direct memory accesses by the bus means 14 to write the receive message string to the message memory means 44. It should be understood that the assertion of a signal throughout this discussion does not necessarily imply a specific logic level or voltage level. It is well known to one skilled in the art that the assertion of a signal can correspond to either a logic 0, a logic 1, low voltage or high voltage.

Having detected the arrival of a new message string, the receive label generation means 34 reads the address of the message string from the bus in step 104 via the INTVECT signal of FIG. 4A(c). As would be known to one skilled in the art, the X's on the timing diagram of FIG. 4A(c) mean that the interrupt vector during those times is a "don't care". That is, the address information is only valid for a short time after the RIVS signal is detected at time $t_0$. Therefore, the receive label generation means 34 must read the message string address while it is still valid. The receive label generation means 34 then generates a receive label for the message string in step 106, which contains the memory address of the message string.

Some time $t_1$ after the RIVS signal has been asserted, the bus means 14 deasserts the STAC signal of FIG. 4A(f) during the writing of the message string to memory to indicate that the bus means 14 is writing a receive message string. The interface then checks whether the bus means 14 has completed its write of the message string in step 108 and also shown by the DMA and BIS signals of FIG. 4A(a) and (b) respectively. The receive label generation means 34 detects the completion of the message string write when the STAC signal is asserted at time $t_2$. If the message string write is not yet complete, the interface checks for and captures any message string errors in step 110 via the RERF signal of FIG. 4A(e). As shown in FIG. 4A(e), a state change of the RERF signal during the message string write indicates an error has occurred. As is known to one skilled in the art, the "?"s of FIG. 4A(e) indicate that the particular state at any other time is unimportant as long as a state change does not occur during the write. Furthermore, the message string error checking by the bus means 14 could be implemented in a variety of ways including the use of a parity bit or some other suitable method. If the message string is found to contain errors, the interface sets an error flag in the receive label and returns to step 108 to check if the write has been completed.

However, if instead the interface detects the completion of the message string write step 108 by the assertion of the STAC signal, then the receive label generation means 34 reads and stores the next label address via the label address signals on lines 54 in step 112. Typically the receive label generation means 34 would request and read the next address via the label address signals on lines 54. The receive label is then written to the receive label memory means 40 on lines 22a in step 114. The receive label generation means 34 then increments the label counter in step 116 via the counter increment signals on lines 56.

The label counter means 38 keeps track of the addresses where receive labels are stored in the receive label memory means 40. Each time the label counter is incremented, the label counter means checks 38 for a counter rollover in step 118. A counter rollover limit is determined by the number of possible receive message types being used in the system. It is well known to one skilled in the art that a counter limit could be implemented in several ways. For example, the limit could be programmed via the host means 12 on host reset signals on lines 58 or from the receive label generation means via the counter increment signals on lines 56. In normal operation, the counter should never rollover. This is because the host means 12 also maintains its own internal counter to keep track of the next receive label. When the host means 12 determines that there are no receive message strings ready to be processed the host means 12 has "caught up" with the interface and resets the receive label counter via the host reset signals on lines 58 as described below. As would be appreciated by one skilled in the art, the host means 12 may also use the host reset signals to initialize the label counter means 38.

If it is determined that the receive label counter has rolled over in step 118, then the label counter means 38 sends label counter overflow signals on lines 60 to the host means 12 as shown in step 126. In one embodiment, this signal is held asserted until acknowledged and cleared by the host means 12 via the host reset signals on lines 58.

If, however, the label counter increment does not cause a counter rollover, then the label counter means 38 checks for a host reset signal from the host means 12 on line 58 as shown in step 120. If no host reset signal has been received, then the interface returns from the receive sequence in step 130. However, if a host reset signal is detected in step 120, then the STAC signal is checked by the label counter means 38 in step 122 to determine if another receive message string is being processed. If a receive message string is being processed, then the label counter means 38 waits until the STAC signal is deasserted as shown in step 122. Once the receive message string has been processed, or if a receive message string was not being processed, then the receive label address counter is reset in step 124. In one embodiment, the counter is reset to zero. However, the counter could be reset to any pre-determined value. Once the counter is reset in step 124, the interface returns from the receive sequence in step 130.

Although the receive sequence is illustrated in the flow chart of FIG. 5 as having an enter start step (100) and a return step (130), possibly implying a start and an end, it is known to one skilled in the art that it could be a continuous process which does not necessarily have to be "started" each time a message string is received. Therefore, the interface could continually detect message strings, create receive labels for each message string and sequentially store those receive labels in interface memory, to be periodically serviced by the host means 12 when its processing capability allows.

Figure 6:
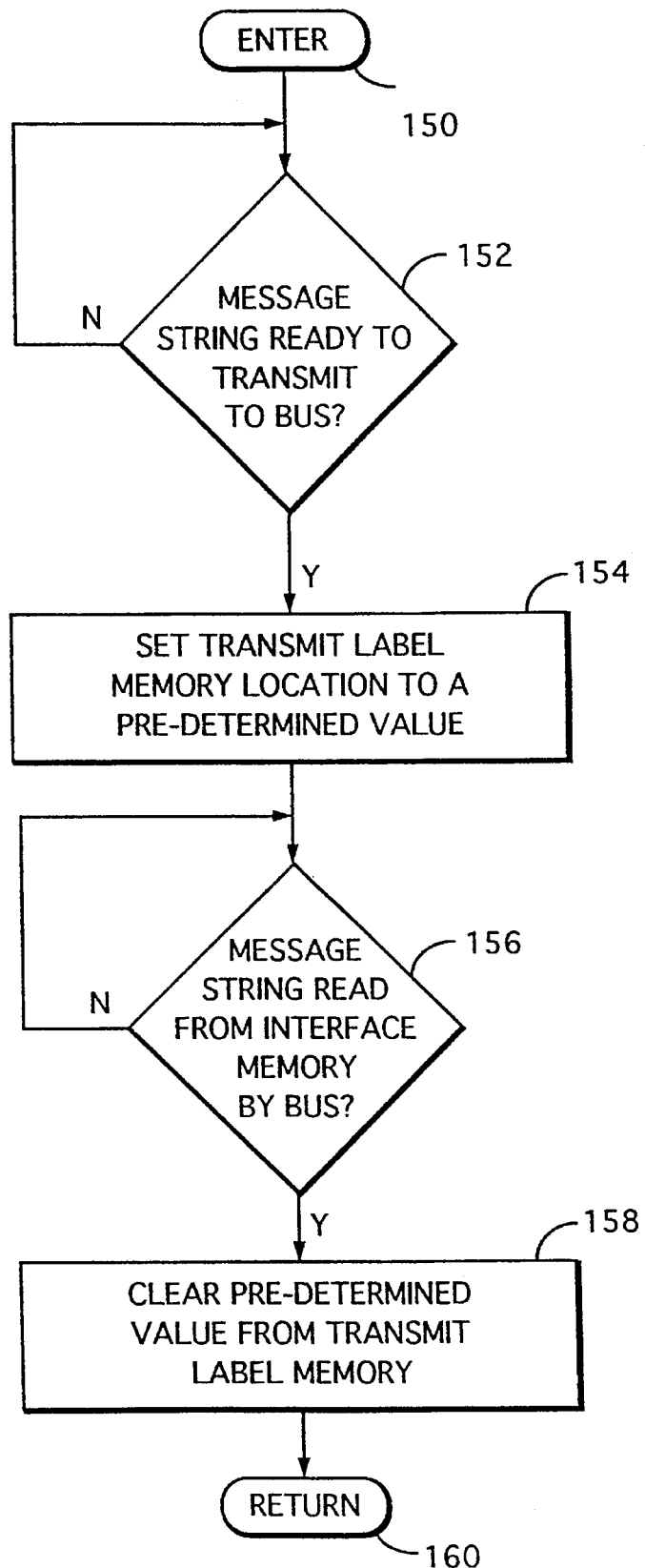
FIG. 6, is a top level flow chart illustration of the interface transmit sequence according to the present invention.

Referring now to the top level flow chart illustration of FIG. 6 and the timing diagram of FIG. 4A which illustrate some particular aspects of the transmit sequence from the perspective of the interface. After entering the transmit sequence in step 150, the interface monitors the bus transmit label signals on lines 20b shown in FIG. 2 in step 152. As shown in more detail in FIG. 3, the bus transmit label signals on lines 20b include a Transmit Interrupt Vector signal (XIVS) on line 62 and the INTVECT and STAC signals discussed above. During step 152, the transmit label generation means 34 continually monitors the XIVS signal of FIG. 4B(*c*) to detect the processing of a transmit message string by the bus means 14. The assertion of XIVS at time $t_0$ means that the bus means 14 has begun reading a transmit message string written to a dedicated memory location in the message memory means 44 by the host means 12. However, before the host means 12 can write a transmit message string to interface memory, it must first verify that the bus means 14 has completed processing of the last transmit message string and then signal the bus means 14. The interface maintains transmit labels for each message string being transmitted onto the bus means 14. These transmit labels are available to the host means 12 on a read only basis and indicate whether the corresponding transmit message string is being processed by the bus means 14. It should be understood that the interface could support transmission of multiple message strings. However, for data coherency purposes, the transmit label memory means 42 need only identify the specific transmit message string presently being transmitted by the host means 12.

After verifying that the processing of the previous transmit message string has been completed, the host means 12 then signals the bus means 14 via host transmit signals on lines 64 that a transmit message string is ready to be transmitted. At that point in time the interface must provide the host means 12 with sufficient time to write the message string to the message memory means 44 before the bus means 14 asynchronously begins processing that transmit message string. In response, the bus means 14 signals the interface via the XIVS signal that a transmit message string is being processed by the bus means 14.

After detecting that a transmit message string has been written to interface RAM in step 152, the interface updates the transmit label corresponding to that message string to a pre-determined value. This value is known to the host means 12 and is used to indicate that particular message string is being processed. This could be non-zero value, for example, or any other unique value.

Before the host means 12 executes message string writes to the message memory means 44, it reads the transmit label memory means 42 to ensure the same message string is not in transmission. The transmit label generation means 36 then monitors the STAC signal of FIG. 4B(*e*) to detect when the bus means has finished reading the transmit message string out of the message memory means 44. Upon completion of its read, the bus means will deassert the STAC signal at time $t_1$, indicating to the transmit label generation means 36 that the transmit message string has been completely read from interface RAM. In response, the transmit label generation means 36 will then clear the pre-determined value from the transmit label for this message string in step 158. In one particular embodiment, this could mean changing the value to a non-zero value. The interface returns from the transmit sequence in step 160. The next time the host means 12 checks this transmit label value, it will be set to a value other than the pre-determined value, indicating that the interface is ready to accept the next transmit message string.

Although the transmit sequence is illustrated in the flow chart of FIG. 5 as having an enter start step (150) and a return step (160), possibly implying a start and an end, it is known to one skilled in the art that it could be a continuous process which does not necessarily have to be "started" each time a message string is received. Therefore, the interface could continually transmit message strings to be read by the bus means 12 when its processing capability allows.

It should be understood that other embodiments of the present invention are possible without departing from the scope and spirit of the invention described above. In one such embodiment, the bus signals 24 and the memory host signals 26 of FIG. 1 include bus message string signals and memory host message string signals respectively. Similarly, the memory bus signals 30 of FIG. 1 include memory bus message string signals.

Still other embodiments of the present invention are possible without departing from the scope and spirit of the invention described above. In one such other embodiment, the bus signals 24 and the bus label signals 20 of FIG. 1 include primary bus signals and secondary bus signals respectively. Similarly, the label signals 22 of FIG. 1 include secondary signals. Finally, the memory bus signals 30 and the label signals 32 of FIG. 1 include primary memory signals and secondary memory signals respectively.

Although the present invention has been described and discussed herein with respect to one or more embodiments, other arrangements or configurations may also be used that do not depart from the spirit and scope hereof. Hence, the present invention is deemed limited only by the appended claims and the reasonable interpretation thereof.

What is claimed is:

1. An interface between a host means and a bus means comprising:

label generation means, responsive to bus label signals from the bus means, for providing label signals; and memory means, responsive to bus signals from the bus means, for providing memory host signals to the bus means, said memory means being further responsive to said label signals from said label generation means for storing said label signals as label memory signals, said memory means being further responsive to host signals from the host means, either for providing memory bus signals to the host means when the host means reads memory bus information from the memory means, or for providing said label memory signals to the host means when the host means reads label memory information from the memory means.

2. The interface as claimed in claim 1, wherein the bus label signals include bus receive label signals and bus transmit label signals, and wherein said label signals include receive label signals and transmit label signals, and wherein said label generation means comprises:
  receive label generation means, responsive to the bus receive label signals from the bus means, for providing said receive label signals; and
  transmit label generation means, responsive to the bus transmit label signals from the bus means, for providing said transmit label signals.

3. The interface as claimed in claim 2, wherein said memory means further comprises:
  receive label memory means, responsive to said receive label signals from said receive label generation means, for storing said receive label signals, said receive label memory means being further responsive to the host signals from the host means, for providing said receive label signals to the host means,
  transmit label memory means, responsive to said transmit label signals from said transmit label generation means, for storing said transmit label signals, said transmit label memory means being further responsive to the host signals from the host means, for providing said transmit label signals to the host means; and
  message memory means, responsive to the bus signals from the bus means, either for storing said bus signals as said memory bus signals when the bus means writes bus information to said message memory means, or for providing said memory host signals to the bus means when the bus means reads memory host information from said message memory means, said message memory means being further responsive to the host signals from the host means, either for storing said host signals as said memory host signals when the host means writes host information to the message memory means, or for providing said memory bus signals to the host means when the host means reads memory bus information from said message memory means.

4. The interface as claimed in claim 3,
  wherein said label generation means further includes label counter means, responsive to counter increment signals from said receive label generation means and bus receive label signals from the bus means, for providing receive label address signals to said receive label generation means.

5. The interface as claimed in claim 1, wherein said label memory signals include receive label signals and transmit label signals and said memory means further comprises:
  receive label memory means, responsive to said receive label signals from receive label generation means in said label generation means, for storing said receive label signals as receive label memory signals, said receive label memory means being further responsive to the host signals from the host means for providing said receive label memory signals to the host means when the host means reads receive label memory information from said receive label memory means;
  transmit label memory means, responsive to said transmit label signals from transmit label generation means in the label generation means, for storing said transmit label signals as transmit label memory signals, said transmit label generation means being further responsive to the host signals from the host means for providing said transmit label memory signals to the host means when the host means reads transmit label memory information from said transmit label memory means; and
  message memory means, responsive to the bus signals from the bus means, either for storing said bus signals as said memory bus signals When the bus means writes bus information to the message memory means, or for providing said memory host signals to the bus means when the bus means reads memory host information from the message memory means, said message memory means being further responsive to the host signals from the host means, either for storing said host signals as said memory host signals when the host means writes host information to the message memory means, or for providing said memory bus signals to the host means when the host means reads the host memory information from the message memory means.

6. The interface as claimed in claim 5, wherein said label generation means further includes label counter means, responsive to counter increment signals from said receive label generation means and bus receive label signals from the bus means, for providing receive label address signals to the receive label generation means.

7. A method for interfacing a host means and a bus means with an interface having a memory means and a label generation means, comprising the steps of:
  providing label signals from the label generation means in response to bus label signals from the bus means;
  providing memory host signals from the memory means to the bus means in response to bus signals;
  responding to said label signals for storing said label signals as label memory signals in the memory means;
  providing memory bus signals from the memory means to the host means in response to host signals when the host means reads memory bus information from the memory means; and
  providing said label memory signals from the memory means to the host means when the host means reads label memory information from the memory means in response to the host signals.

8. The method as claimed in claim 7,
  wherein said label signals include receive label signals and transmit label signals;
  wherein the bus label signals include bus receive label signals and bus transmit label signals; and
  wherein said method further includes:
    providing said receive label signals from receive label generation means in the label generation means in response to the bus receive label signals; and
    providing said transmit label signals from transmit label generation means in the label generation means in response to the bus transmit label signals.

9. The method as claimed in claim 8, wherein said method further includes the steps of:
  storing said receive label signals as receive label memory signals in receive label memory means in the memory means in response to said receive label signals;
  providing said receive label memory signals to the host means in response to the host signals;
  storing said transmit label signals as transmit label memory signals in transmit label memory means in the memory means in response to said transmit label signals;
  providing said transmit label memory signals to the host means in response to the host signals;
  storing said bus signals as said memory bus signals in the memory means in response to the bus signals when the bus means writes bus information to the memory means;
  providing said memory host signals to said bus means in response to the bus signals when the bus means reads memory host information from the memory means;

storing said host signals as said memory host signals in the memory means; and providing said memory bus signals to the host means in response to the host signals.

10. The method as claimed in claim 9, wherein said method further includes the step of:

providing receive label address signals in response to the bus receive label signals.

11. The method as claimed in claim 7, wherein said label signals include receive label signals and transmit label signals and wherein said method further includes the steps of:

storing said receive label signals as receive label memory signals in a receive label memory means in the memory means;

providing said receive label memory signals to the host means in response to the host signals;

storing said transmit label signals as transmit label memory signals in a transmit label memory means in the memory means;

providing said transmit label memory signals in response to the host signals;

storing said bus signals as said memory bus signals in the memory means in response to the bus signals when the bus means writes to the memory means;

providing said memory host signals to the bus means in response to bus signals when the bus means reads memory host information from the memory means;

storing said host signals as said memory host signals in the memory means when the host means writes host information to the memory means; and providing said memory bus signals to the host means in response to the host signals when the host means reads memory bus information from the memory means.

12. The method as claimed in claim 11, wherein said method further includes the step of:

providing receive label address signals in response to counter increment signals.

* * * * *